United States Patent [19]
Joveux-Bouillon et al.

[11] Patent Number: 5,188,538
[45] Date of Patent: Feb. 23, 1993

[54] ELECTRICAL CONNECTION, IN PARTICULAR FOR A MODULAR, MEDIUM-TENSION ELECTRICITY SUBSTATION

[75] Inventors: Bernard Joveux-Bouillon, Bage Le Chatel; Jean Maineult, Ceyzeriat, both of France

[73] Assignee: GEC Alsthom SA, Paris, France

[21] Appl. No.: 829,775

[22] Filed: Jan. 31, 1992

[30] Foreign Application Priority Data

Feb. 1, 1991 [FR] France ................ 91 01154

[51] Int. Cl.$^5$ ............................................. H01R 13/52
[52] U.S. Cl. ...................... 439/271; 439/198; 439/787
[58] Field of Search ............ 439/190, 194, 198, 199, 439/200, 201, 205, 271–276, 278, 281, 787

[56] References Cited

U.S. PATENT DOCUMENTS

| 3,639,892 | 2/1972 | Dill et al. | |
|---|---|---|---|
| 4,054,351 | 10/1977 | Gallay et al. | 439/199 |
| 4,932,887 | 6/1990 | Kataoka et al. | 439/198 |

FOREIGN PATENT DOCUMENTS

| 0199208 | 10/1986 | European Pat. Off. | |
|---|---|---|---|
| 3738695 | 2/1989 | Fed. Rep. of Germany | 439/198 |
| 1528351 | 10/1978 | United Kingdom | 439/198 |

Primary Examiner—David L. Pirlot
Attorney, Agent, or Firm—Sughrue, Mion, Zinn, Macpeak & Seas

[57] ABSTRACT

The present invention consists in a connection arrangement between at least one pair of conductors that pass through respective walls (6). Each wall (6) is made of insulating material and the two walls are connected together via a peripheral sealing gasket received in a groove (7') and delimiting an empty space between the walls which is filled with dry air. The connection made in this way is small in size and is particularly easy to implement.

7 Claims, 2 Drawing Sheets

ELECTRICAL CONNECTION, IN PARTICULAR FOR A MODULAR, MEDIUM-TENSION ELECTRICITY SUBSTATION

FIELD OF THE INVENTION

The present invention relates to an arrangement for connecting at least one pair of conductors, a "first" conductor of each pair passing through a wall of a first compartment, and the "second", other conductor of each pair passing through a wall of a second compartment, the end of the first conductor being connected to the end of the second conductor by an electrical link member, said electrical connection being protected by an insulating arrangement.

A preferred application of this connection arrangement consists in equipment for modular electricity substations having casing that is under gaseous insulation, in particular for medium tension.

BACKGROUND OF THE INVENTION

It is known to make electrical connections in air which are insulated by large-dimension screens of insulating material. Such connections are degraded by condensation.

It is also possible to embed the electrical link in an insulating material. This method needs implementing on site which gives rise to a particularly high cost price for this type of link. In addition, the link cannot be dismantled easily.

Furthermore, two types of connection are used for linking electricity substations. There are so-called "oil" connections and so-called "elastomer" connections.

The first type of connection is described, for example, in French patent document FR-2 069 931 which relates to electrical linking devices between at least two contacts under tension in various compartments of an electricity substation. Those high tension electrical link devices enable portions under tension belonging to various compartments to be decoupled. Each compartment includes a cup containing a liquid dielectric and the bottom of the cup is provided with a pluggable contact connected to the conductor. An upsidedown U-shaped busbar of conductor material interconnects two contacts. The emerging portion of the busbar is covered in insulation.

Such connections are relatively bulky and also give rise to problems of sealing.

French patent document FR-2 295 599 describes an elastomer type connection. More precisely, the junction described in that patent is intended for electrically interconnecting portions of sets of busbars or for connecting cable in an electricity substation. The conductors are coated in solid insulation such as epoxy resin. Electrical connections therebetween are surrounded by a metal deflector. An elastomer sleeve is to be found around the connection and the insulation, and is compressed by metal shells which are assembled together by bolts or the equivalent. These shells form conical fields at the two ends of the deflectors, which fields connect with the metal plated surfaces of the insulation.

Such connections also present problems of implementation. They are not easy to dismantle and they cannot be tested on site.

SUMMARY OF THE INVENTION

The invention proposes solving the above problems by providing an electrical connection arrangement which is particularly easy to implement, requiring no special treatment for assembly. The arrangement is easily assembled and dismantled; it is not very bulky and its sealing characteristics are such that the connection may be flooded. It is therefore relatively cheap, while providing good electrical properties. It does not give rise to partial discharging at 1.5 U where U is the network voltage, and it withstands lightning surges without requiring the conventional distances between contacts.

To do this, the connection arrangement of the invention is remarkable in that the walls are made of insulating material and are connected to each other by means of a peripheral sealing gasket guaranteeing a space between them that is filled with dry air.

In order to dry the air between the walls, a desiccator is disposed in the space delimited by the walls, close to the periphery thereof.

The humidity of the air is thus guaranteed and it becomes lower than the humidity on the day the connection was assembled.

It is preferable for the desiccator to be as far away as possible from the electrical contacts. The desiccator may be dimensioned with a large safety margin in order to dry the air in the event of microleaks through the sealing gasket.

In a preferred embodiment, each wall includes tongues that project away towards the outside of the compartment and that surround each conductor, the tongues of the first wall interfitting between the tongues of the second wall, thereby establishing a space having baffles between the walls.

Preferably, the tongues are disposed in concentric circles around each conductor.

This assembly of alternating tongues makes it possible simultaneously to increase the lengths of the creepage distances and of the sparking distances, which are the two most important magnitudes in dielectric behavior. This constructional disposition thus makes it possible to reduce the bulk of the connection system.

The preferred application of the connection arrangement of the invention consists in equipment for modular electricity substations having casing under gaseous insulation, and in particular for use at medium tension, with the set of busbars passing through the side walls of the casing.

The invention is described below in greater detail with reference to the drawings which show one embodiment only.

DESCRIPTION OF THE PREFERRED EMBODIMENT

Figure 1:
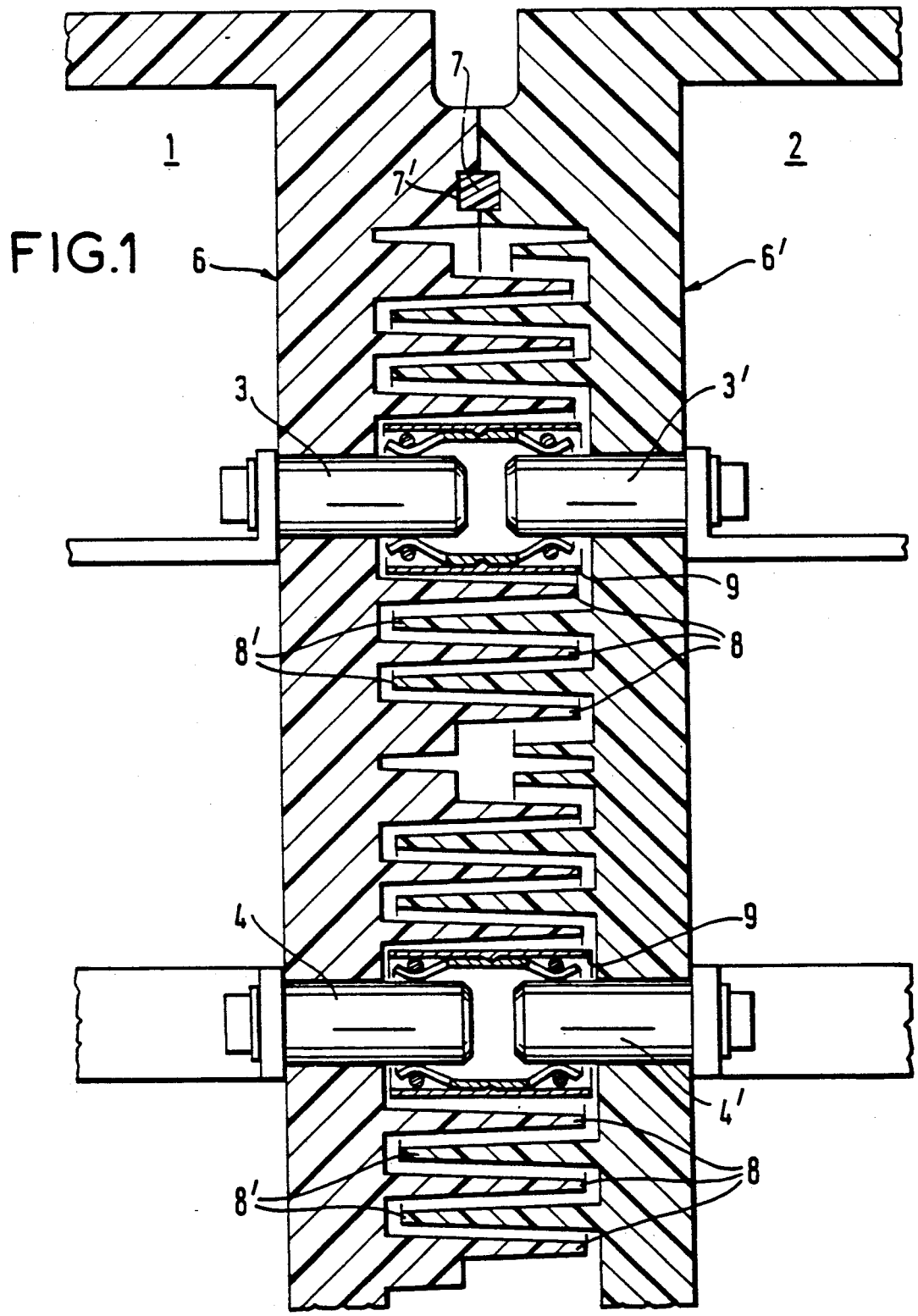
FIG. 1 is a section view on a plane including the axis of a plurality of conductors connected in pairs, in an arrangement in accordance with the present invention.

FIG. 1 shows two compartments 1 and 2 which are electrically connected together by means of contacts each passing through a respective one of the walls of said compartments. Only two pairs of contacts are shown in FIG. 1 which is a fragmentary view. In general, for a link in a modular electricity substation, each set of busbars includes three busbars. The pairs of contacts 3, 3' & 4, 4' are interconnected by respective electrical connectors 9 that are known per se.

The contacts 3, 4, 3', 4' pass through the walls 6 and 6' dolimiting the compartments 1 and 2. These walls 6 and 6' are made of insulating material, e.g. epoxy resin or polyurethane.

To insulate the electrical connection, they are connected to each other by means of a sealing gasket 7. Thus, a space is dolimited between them which is filled with dry air that provides good dielectric behavior. In the example shown, the elastomer gasket 7 is inserted in grooves 7' formed in each of the walls 6 and 6' respectively, and surrounding the set of contacts. In general, the gasket 7 is positioned close to the periphery of the wall. The sealing gasket may also be shaped by an interfitting tongue and groove arrangement formed on respective ones of the walls.

During assembly, a desiccator, preferably in a small bag, is placed in said space, and serves to dry the air that is imprisoned inside the connection arrangement.

The desiccator may previously be saturated with the gas $SF_6$. It will release this gas progressively into the airtight cavity, thereby further improving its dielectric behavior over time.

Each of the walls 6 and 6' is made in analogous manner. It includes tongues 8, 8' projecting outwards from the wall 6, 6'. These screen-forming tongues are disposed around each contact 3, 4, 3', 4'. When the walls 6, 6' are connected together, the tongues in the walls interfit between one another forming a dry air space that is baffle-shaped, as can be seen in FIG. 1.

Figure 2:
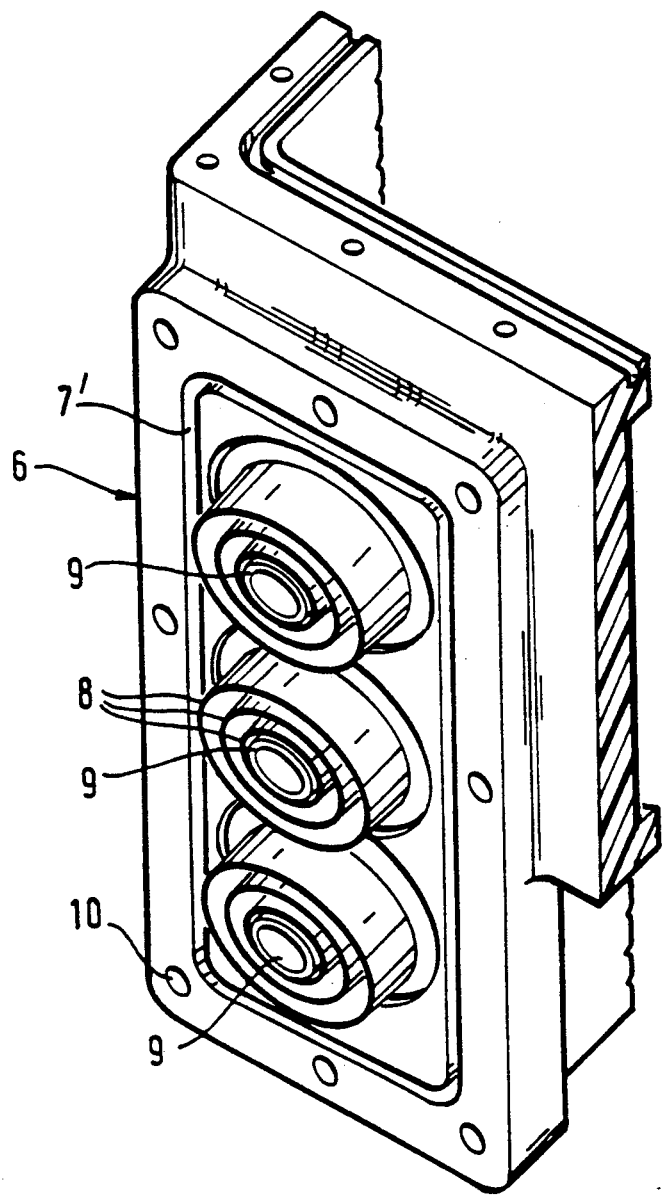
FIG. 2 is a perspective view of a wall fitted with an arrangement of the invention and having a set of conductors passing therethrough.

A preferred disposition for the tongues is visible in FIG. 2. The tongues are disposed in the form of concentric circles around each conductor.

The walls are clamped against each other by bolts or by some equivalent mechanical means, via an arrangement of tapped orifices 10. The peripheral sealing gasket received in the groove 7' is thus clamped between the walls. The gasket is preferably made of elastomer.

The preferred implementation as shown consists in linking the set of busbars of the modular electricity substation having a casing under gaseous insulation, in particular for use at medium tension.

The sets of busbars pass through the walls 6 and 6' by means of their contacts 3, 4, 3', and 4'. These walls 6 and 6' constitute the side walls of modular substations which can thus be electrically interconnected by the connection arrangement in accordance with the invention.

This arrangement may also be used in a more general manner for interconnecting a single pair of contacts. It may then find an application for linking a cable box or a fuse well to an electricity substation.

We claim:

1. A modular electricity substation having a casing under gaseous insulation, in particular for use at medium tension, said casing comprising first and second side walls (6, 6') facing each other and delimiting respectively a first compartment and a second compartment, said side walls comprising means forming a space therebetween, at least one set of busbars for said substation, said at least one set of busbars including a pair of contacts passing through respective side walls, and an electrical link member within said space and connecting the ends of respective busbar contacts and forming an electrical connection between said at least one set of busbars, and wherein the side walls (6, 6') of said casing are made of insulating material, and a peripheral sealing gasket (7) connecting said side walls together at the periphery of the side walls and guaranteeing said space between the side walls is filled with dry air, thereby forming an insulating arrangement protecting said electrical connection between said at least one set of busbars.

2. A modular electricity substation according to claim 1, wherein the side walls (6, 6') are made of epoxy resin.

3. A modular electricity substation according to claim 1, wherein the side walls (6, 6') are made of polyurethane.

4. A modular electricity substation according to claim 1, wherein each wall (6, 6') includes tongues (8, 8') on the facing surfaces of said side walls and projecting towards each other, said tongues surrounding each conductor, the tongues (8) of the first side wall (6) interfitting between the tongues (8') of the second side wall (6') and being spaced from each other, thereby defining air space baffles between the side walls.

5. A modular electricity substation according to claim 4, wherein the interfitting tongues (8, 8') are disposed in concentric circles around each conductor (3, 4, 3', 4').

6. A modular electricity substation according to claim 1, wherein a desiccator is disposed in said space delimited by the side walls (6, 6'), close to the periphery thereof.

7. A modular electricity substation according to claim 6, wherein the desiccator is saturated with $SF_6$ gas.

* * * * *